United States Patent
Chung et al.

(10) Patent No.: US 8,604,100 B2
(45) Date of Patent: Dec. 10, 2013

(54) INK COMPOSITION FOR OIL-BASED BALLPOINT PEN

(75) Inventors: Doo Young Chung, Wonju-si (KR); Soon Suck Lee, Wonju-si (KR)

(73) Assignees: Suhan Corporation, Mukgye-ri, Gangwon-do (KR); Kotobuki & Co., Ltd., Kawagoe-shi, Saitama-Ken (JP)

( * ) Notice: Subject to any disclaimer, the term of this patent is extended or adjusted under 35 U.S.C. 154(b) by 0 days.

(21) Appl. No.: 13/115,931

(22) Filed: May 25, 2011

(65) Prior Publication Data

US 2011/0293355 A1 Dec. 1, 2011

(30) Foreign Application Priority Data

May 26, 2010 (KR) ........................ 10-2010-0049205

(51) Int. Cl.
*C09D 11/18* (2006.01)
(52) U.S. Cl.
USPC ............................ 523/161; 524/503; 524/516
(58) Field of Classification Search
USPC .................................. 523/161; 524/503, 516
See application file for complete search history.

(56) References Cited

U.S. PATENT DOCUMENTS

| | | |
|---|---|---|
| 6,398,441 B1 | 6/2002 | Takayanagi |
| 6,562,116 B1 | 5/2003 | Satoh |
| 6,786,958 B2 * | 9/2004 | Morita et al. ............. 106/31.64 |
| 7,390,138 B2 * | 6/2008 | Kambayashi ................ 401/209 |
| 2003/0045607 A1 | 3/2003 | Ichikawa |
| 2005/0096410 A1 | 5/2005 | Hattori et al. |

FOREIGN PATENT DOCUMENTS

| | | |
|---|---|---|
| EP | 1 275 704 A1 | 1/2003 |
| EP | 2 390 293 A1 | 11/2011 |
| JP | 2001-098202 A | 4/2001 |
| JP | 2001-152069 | 6/2001 |
| JP | 2001-288396 | 10/2001 |
| KR | 1999-007113 A | 1/1999 |
| KR | 1020020026173 A | 4/2002 |
| KR | 1020040034925 A | 4/2004 |
| KR | 1020040051112 A | 6/2004 |
| KR | 10-0485375 B1 | 4/2005 |

OTHER PUBLICATIONS

Machine translation of JP 2009-197205 A (Sep. 3, 2009).*
PCT International Search Report for PCT Counterpart Application No. PCT/KR2011/003835 with full English translation, 5 pgs. (Feb. 6, 2012).
PCT Notification of Transmittal of International Preliminary Examination Report for PCT Application No. PCT/KR2011/003835, 7 pgs. (Dec. 6, 2012).
PCT Written Opinion of the International Search Authority for PCT Counterpart Application No. PCT/KR2011/003835 with full English translation, 10 pgs. (Feb. 6, 2012).

* cited by examiner

*Primary Examiner* — Vu A Nguyen
(74) *Attorney, Agent, or Firm* — Blakely, Sokoloff, Taylor & Zafman LLP

(57) ABSTRACT

Disclosed are an ink composition for oil-based ballpoint pens which exhibits soft writing sensation due to low viscosity of 300 to 3000 cps, enables writing even at low temperatures and thus exhibits superior stability, and is free of leakage (of ink), and an oil-based ballpoint pen using the same.

10 Claims, No Drawings

INK COMPOSITION FOR OIL-BASED BALLPOINT PEN

BACKGROUND OF THE INVENTION

1. Field of the Invention

The present invention relates to art ink composition for an oil-based ballpoint pen. More specifically, the present invention relates to an oil-based composition for a ballpoint pen, having soft and smooth feel in writing due to low viscosity of 300 to 3000 cps, being capable of writing even at low temperatures, having excellent stability, and being ink leakage-preventive. It further relates to an oil-based ballpoint pen using the ink composition.

2. Description of the Related Art

In general, ink compositions for oil-based ballpoint pens have a high viscosity of about 10,000 to about 25,000 cps. Conventional oil-based ballpoint pens containing the ink compositions have a heavy writing sensation (feeling) due to such high viscosity. The ink compositions undergo great variations in their physical properties such as viscosity depending on surrounding temperatures. Thus disadvantageously, in writing under the circumstance of low temperatures, the ink flow in the conventional oil-based ballpoint pens was not smooth. In order to solve the disadvantages of the ink compositions having high-viscosity for oil-based ballpoint pens, the viscosity of the ink compositions has been controlled by using a low molecular weight resin in combination with a high molecular weight resin. However the use of low molecular weight resin caused disadvantages of ink leakage and line discontinuity during rapid writing.

Accordingly, there has been an increasing need for an ink composition for oil-based ballpoint pens with low viscosity being free of ink leakage and interruption of ink supply upon rapid writing, while having excellent writing sensation.

SUMMARY OF THE INVENTION

It is an object of the present invention to provide an ink composition for oil-based ballpoint pens which has soft and smooth feeling in writing due to low viscosity, enables writing even at a low temperature and thus exhibits superior stability, and is free of ink leakage, and an oil-based ballpoint using the ink composition.

In order accomplish the object of the present invention, as a result of repeated researches, the inventors of the present invention have discovered that an oil-based ballpoint ink pen composition having the following characteristics can solve the disadvantages in the prior art and have completed the present invention based on the discovery.

In accordance with one aspect of the present invention, provided is an ink composition for oil-based ballpoint pens, comprising: i) a coloring agent; ii) binder resin containing a polyvinylbutyral (PVB) resin and a polyvinylpyrrolidone (PVP) resin; and iii) a solvent consisting of a primary solvent with a high boiling point and a secondary solvent with a low boiling point, wherein the viscosity of the ink composition is 300 to 3,000 cps.

DETAILED DESCRIPTION OF THE INVENTION

In the ink composition of the present invention, the binder resin is used as a mixture of a PVB resin with a molecular weight of 15,000 to 35,000 and a PVP resin with a molecular weight of 20,000 to 80,000.

The PVB resin imparts viscosity to the ink composition and is preferably present in an amount of 3 to 4% by weight. When the amount of the PVB resins is lower than 3% by weight, the viscosity of the ink composition greatly decreases, causing leakage of ink, and when the amount exceeds 4% by weight, the viscosity increases, disadvantageously causing deterioration in writing sensation and in long-term storage stability of ink composition (maintenance of writing instrument).

The PVP resin imparts tackiness to the ink composition and thus prevents disconnection of writing lines and is preferably present in an amount of 0.5 to 1% by weight. When the PVP resin is present in an amount less than 0.5% by weight, the ink composition leaks from ballpoint pens, and when the PVP resin is present in an amount exceeding 1% by weight, maintenance of writing instrument is deteriorated.

As such, the present invention uses a combination of the PVB resin and the PVP resin, thus being effective in solving the ink leakage problem in ink compositions with the low viscosity ($1/10$ to $1/20$ of conventional ink compositions' viscosity), improving writing sensation and reducing disconnection of writing lines.

In the ink composition of the present invention, the solvent is present in an amount of 55 to 80% by weight and is used as a mixture of a primary solvent and a secondary solvent.

The primary solvent has a high boiling point (190° C. or higher) and examples thereof include phenoxy ethanol (244° C.), benzyl alcohol (205° C.), ethylene glycol 197° C.), diethylene glycol (244° C.), 1,3-butane diol (207° C.), hexylene glycol (197° C.), diethylene glycol monomethyl ether (194° C.), dipropylene glycol monomethyl ether (190° C.) tripropylene glycol monomethyl ether (243° C.), and combinations thereof. The primary solvent readily dissolves a coloring agent and a binder resin, prevents drying of solvent in the ink composition even at the areas of high temperatures or under high temperature conditions and maintains stability of ink composition. Preferably, the primary solvent is used in an amount of 45 to 61.5% by weight. When the primary solvent is used in an amount of less than 45% by weight, the ink composition in ballpoint pens vaporizes and solidifies, and maintenance of writing instrument is deteriorated as the viscosity of the ink composition is not controlled. When the primary solvent is used in an amount exceeding 61.5% by weight, the problem of ink-leakage occurs The secondary solvent has a low boiling point of 100 to 130° C. and examples thereof include propylene glycol monomethyl ether (120° C.), propylene glycol monoethyl ether (132° C.), propylene glycol monopropyl ether and combinations thereof. The secondary solvent more quickly dries at room temperature, than the primary solvent, thus reduces ink drying delay after writing. Even on the tip of ballpoint pens, the secondary solvent more quickly dries than the primary solvent, thus prevents ink leakage. Preferably, the secondary solvent is used in an amount of 10 to 15% by weight. When the secondary solvent is used in an amount less than 10% by weight, ink drying is deteriorated and thus the hand using the ballpoint pen is stained with the ink. When the secondary solvent is used in an amount exceeding 15% by weight, maintenance of the writing instrument is deteriorated.

When a solvent with a low boiling point (high vapor pressure) is used as the primary solvent for the ink composition, drying of solvent in the ink composition occurs even at the back of a tube (PP), of the ink composition under relatively high temperature conditions and also occurs by permeability of the tube of ink composition, thus causing serious negative effects (solidification and denaturation of ink composition) on the stability of the ink composition. The present invention can solve these problems by using a solvent having a high boiling point as the primary solvent. In addition, the ink composition of the present invention can reduce ink drying-delay after writing by conventional pens by using the primary solvent in combination with the secondary solvent having a low boiling point. In addition, according to the present invention, since on the tip end of ballpoint pens, the secondary solvent more quickly dries than the primary solvent, ink leakage can be reduced. According to the present invention, since drying after writing is facilitated, contamination caused by writing lines can be prevented.

The coloring agent used for the ink composition of the present invention may be a dye, a pigment or a mixture thereof.

Examples of dyes generally used for the ink composition include direct dyes, acidic dyes, basic dyes, mordant dyes and acidic mordant dyes, spirit dyes, azoic dyes, sulfur dyes and sulfur at dyes, vat dyes, dispersion dyes, fat-soluble dyes, edible dyes, metal composite salt dyes, and inorganic or organic pigments generally used for ink pigment compositions. The dye is added in an amount of 20 to 30% by weight with respect to the total amount of the ink composition.

Organic and inorganic pigments for ink composition of ballpoint pens can be used as the pigment in the present invention. Preferably, the pigment has low solubility to organic solvents and has an average particle size after dispersion of 30 to 700 nm. The pigment is added in an amount of 5 to 10% by weight with respect to the total amount of the ink composition. The pigment may be used type of pigment alone or in combination of two or more types of pigments. If necessary, a dye or dispersing agent using an inorganic pigment may be added in the amount which does not have a negative effect upon dispersion stability. In addition, examples of pigments include resin emulsions obtained by polymerization of styrene, acrylic acid, acrylate ester, methacrylic acid, methacrylate ester, acrylonitrile and olefin monomers, hollow resin emulsions which swell in the ink composition and become amorphous, and organic multi-color pigments composed of colored resin particles obtained by coloring an emulsion with a coloring agent.

If necessary, the ink composition may further comprise at least one additive, selected from rust inhibitors, antimycotic agents, surfactants, lubricants, leak inhibitors, wetting agents and the like, which is compatible with the ink composition and does not have a negative effect thereon. Particularly preferably, the lubricant is polyoxyethylene alkyl ether. The additive of the ink composition is present in an amount of 1 to 3% by weight.

EXAMPLES

Now, the present invention will be described in more detail with reference to the following Examples. These examples are only provided to illustrate the present invention and should not be construed as limiting the scope and spirit of the present invention.

Preparation of Ink Composition

Ingredients were mixed in accordance with the composition of Examples 1 to 4 and comparative Examples 1 to shown in Table to prepare an in composition. Specifically, a solvent was weighed, a binder resin and a surfactant were added thereto, dissolved at 70 to 75° C. for 4 hours, and a dye was weighed and added at 70 to 75° C. for 15 hours or longer. When the mixture passed a microscope test (when undissolved contents were not observed), a pigment was added thereto and dispersed for 3 hours or more (maintained at 50° C. or lower). When the resulting mixture passed a microscope test (when undissolved contents were not observed and the pigment was homogeneously dispersed in the composition), the preparation of the ink composition was completed.

Methods and Criteria of Quality Evaluation

The ink compositions thus prepared were charged into a ballpoint pen using a plastic or metal pipe, or a metal tip and were then tested as follows.

(a) Writing sensation: softness and writing pressure during manual writing were compared based on answers of consumers. Light writing sensation was represented by "⊚", medium writing sensation was represented by "o", and heavy writing sensation was represented "Δ".

(b) Writing maintenance, ink leakage and line discontinuity during rapid writing: the prepared ballpoint pens were kept under high temperature and high humidity conditions (80% at 50° C. and 80% at 60° C.) in upper, parallel and lower directions for 4 months or longer, ink degeneration and leakage on the tip of the ballpoint pen at an interval of 15 days were evaluated by manual and machine writing tests (weight: 200 g/writing angle: 70±5 degrees/writing speed: 8 m/min). Good maintenance and low leak frequency was represented by "⊚", medium maintenance a and medium leak frequency were represented by "o", and bad maintenance and high leak frequency was represented by "Δ". In addition, line discontinuity during rapid writing was confirmed by a mechanical writing test. Non-discontinuity was represented by "⊚", slight line discontinuity was represented by "o", and frequent discontinuity was represented by "Δ".

(c) Writing dryness: 5 to 10 seconds after writing on paper, the ink present thereon was rubbed by hand and spreading and contamination were compared. Low spreading and contamination were represented by "⊚", medium spreading and contamination were represented by "o", and high spreading and contamination were represented by "Δ".

(d) Ink clot: Ink clot was evaluated by the number of ink clumps formed on the tip of the ballpoint pen from initial writing to final writing (0 to 1000 m or more) under the above (b) conditions: Small clumping number was represented by "⊚", medium clumping number was represented by "o", and large clumping number was represented by "Δ".

TABLE 1

| | | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Coloring agent | Pigment | Carbon black | 5 | | | 10 | 5 | | | 5 | 10 | |
| | Pigment | CI pigment red 254 | | 5 | | | | 5 | | | | |
| | Pigment | CI pigment blue 60 | | | 5 | | | | 5 | | | |
| | Dye | Valifast black 3830 | | | | | | | | | | 25 |
| | Dye | Valifast black 1807 | 20 | | | | 20 | 20 | | 20 | | |
| | Dye | Valifast red 1306 | | 20 | | | | | | | | |
| | Dye | Valifast violet 1701 | | | 5 | | | | 5 | | | |
| | Dye | Spilon black GMH | | | | 20 | | | | | 20 | |
| | Dye | Valifast blue 1605 | | | 20 | | | | 20 | | | |

TABLE 1-continued

| | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Dye | Spilon red CGH | | | | | | | | | | |
| Dye | Valifast yellow 1101 | | | | | | | | | | |
| Binder resin | PVP K30 | 0.5 | 0.5 | 0.5 | | 0.5 | 0.5 | 0.5 | 0.5 | | |
| | PVPK90 | | | 0.5 | 0.5 | | | | 0.5 | 0.5 | |
| | PVPK120 | 0.5 | 0.5 | | 0.5 | 0.5 | 0.5 | | 0.5 | 0.5 | |
| | Synthetic RESIN SK | | | | | 10 | 10 | 10 | | | |
| | PVB BL-10 | 4 | | | | | | | 2 | | |
| | PVB BM-S | | | | | | | | | | 6 |
| | TAMANOL PA | | | | | | | | | | 12 |
| | PVB BM-1 | | 4 | 4 | 4 | | | | | | |
| Solvent | Benzyl alcohol | 8.6 | 10.4 | 9.4 | 9.4 | 14.2 | 14.2 | 11.2 | 10.4 | 20 | |
| | 2-phenoxy ethanol | 43.4 | 41.6 | 37.6 | 37.6 | 46.8 | 46.8 | 44.8 | 59.6 | 6 | |
| | Diethylene glycol monobutyl ether | | | | | | | | | | 10 |
| | Propylene glycol monoethyl ether | 15 | 15 | 15 | 15 | | | | | 40 | 47 |
| Surfactant | Polyoxyethylene alkyl ether | 1 | 1 | 1 | 1 | | | | | | |
| Additive | Antiseptic, Rust inhibitor | 2 | 2 | 2 | 2 | 3 | 3 | 3 | 2 | 3 | |
| Total | | 100 | 100 | 100 | 100 | 100 | 100 | 100 | 100 | 100 | 100 |
| Product Quality | Writing sensation | ◎ | ◎ | ◎ | ◎ | Δ | Δ | Δ | ○ | ○ | ○ |
| | Writing maintenance | ◎ | ◎ | ◎ | ◎ | Δ | Δ | Δ | ○ | Δ | Δ |
| | Line discontinuity during rapid writing | ◎ | ◎ | ◎ | ◎ | Δ | Δ | Δ | Δ | Δ | Δ |
| | Dryness | ◎ | ◎ | ◎ | ◎ | Δ | Δ | Δ | Δ | ◎ | ○ |
| | Ink clot during writing | ◎ | ◎ | ◎ | ◎ | Δ | Δ | ○ | Δ | ○ | Δ |
| | Leakage | ◎ | ◎ | ◎ | ◎ | Δ | Δ | Δ | Δ | ◎ | ○ |

Examples 1 to 4 exhibited a viscosity of about 1,000 to about 2,000 cps, superior writing sensation, and good dryness and writing maintenance, were free of ink clot during writing, leakage and line discontinuity during rapid writing.

Comparative Example 1 exhibited a viscosity of about 12,000 to about 15,000 cps, which is comparable to that of conventional ink compositions, low stability, bad writing sensation and dryness, serious ink clot and large amount of leakage. Comparative Examples 2 and 3 were similar to Comparative Example 1. Comparative Example 4 had a low viscosity of about 2,000 cps, but exhibited bad qualities in terms of dryness, ink clot and leak due to absence of secondary solvent. Comparative Example 5 exhibited a low viscosity of 2,000 cps, but exhibited bad writing maintenance due to the large amount of secondary solvent. Comparative Example 6 exhibited bad stability, since it had a high viscosity of 12,000 cps and did not use a primary solvent.

The ink composition for oil-based ballpoint pens according to the present invention exhibits light, and soft writing sensation due to low viscosity of 300 to 3,000 cps, is free variation in ink flow depending on variation (increase or decrease) in surrounding temperatures and thus exhibits superior stability. In particular, the ink composition enables writing at low temperatures and is free of ink leakage depending on the tip material or structure. In particular, the ink composition uses a solvent having a low vapor pressure as a primary solvent, thus reducing volatilization of the solvent present in the ink composition and preventing deterioration in quality caused by ink solidification or denaturation. Also, the ink composition uses, as a binder resin, a combination of two kinds of resins with high molecular weights rather than a low molecular weight resin, thus controlling viscosity and preventing ink leakage due to low-viscosity ink and line discontinuity during rapid writing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ink composition for oil-based ballpoint pens, comprising:
    25 to 40% by weight of a coloring agent;
    3.5 to 5% by weight of a binder resin comprising a polyvinylbutyral (PVB) resin and a polyvinylpyrrolidone (PVP) resin;
    45 to 61.5% by weight of a primary solvent having a high boiling point of 190° C. or higher; and
    10 to 15% by weight of a secondary solvent having a low boiling point of 100° C. to 130° C.

2. The composition according to claim 1 the PVB resin is present in an amount of 3 to 4% by weight and the PVP resin is present in an amount of 0.5 to 1% by weight.

3. The composition according to claim 1, wherein the primary solvent is selected from the group consisting of phenoxy ethanol, benzyl alcohol, ethylene glycol, diethylene glycol, 1,3-butane diol, hexylene glycol, diethylene glycol monomethyl ether, dipropylene glycol monomethyl ether, tripropylene glycol monomethyl ether and a combination thereof, and the secondary solvent is selected from the group consisting of propylene glycol monomethyl ether, propylene glycol monoethyl ether, propylene glycol monopropyl ether and a combination thereof.

4. The composition according to claim 1, further comprising:
    1 to 3% by weight of at least one additive selected from the group consisting of rust inhibitors, antimycotic agents, surfactants, lubricants and wetting agents, based on 100% by weight of the ink composition.

5. The composition according to claim 4, wherein the ink composition comprises polyoxyethylene alkyl ether as the lubricant.

6. The composition according to claim 1, wherein the ink composition has a viscosity of 300 to 3,000 cps.

7. The composition according to claim 2, wherein the primary solvent is selected from a group consisting of phenoxy ethanol, benzyl alcohol, ethylene glycol, diethylene glycol, 1,3-butane diol, hexylene glycol, diethylene glycol monomethyl ether, dipropylene glycol monomethyl ether, tripropylene glycol monomethyl ether and a combination thereof, and the secondary solvent is selected from a group consisting of propylene glycol monomethyl ether, propylene glycol monoethyl ether, propylene glycol monopropyl ether and a combination thereof.

8. The composition according to claim 2, wherein the ink composition has a viscosity of 300 to 3,000 cps.

9. The composition according to claim 7, wherein the ink composition has a viscosity of 300 to 3,000 cps.

10. An oil-based ballpoint pen filled with an ink composition comprising:
   25 to 40% by weight of a coloring agent;
   3.5 to 5% by weight of a binder resin comprising a polyvinylbutyral (PVB) resin and a polyvinylpyrrolidone (PVP) resin;
   45 to 61.5% by weight of a primary solvent having a high boiling point of 190° C. or higher; and
   10 to 15% by weight of a secondary solvent having a low boiling point of 100° C. to 130° C.

* * * * *